United States Patent
Dorenbos et al.

(10) Patent No.: US 11,326,100 B2
(45) Date of Patent: May 10, 2022

(54) SCINTILLATOR INCLUDING A MATERIAL DOPED WITH AN ACTIVATOR AND CO-DOPANT AND RADIATION DETECTOR INCLUDING THE SCINTILLATOR

(71) Applicants: Stichting Voor De Technische Wetenschappen, Utrecht (NL); Universite De Berne, Berne (CH)

(72) Inventors: Pieter Dorenbos, Rijswijk (NL); Karl Krämer, Berne (CH); Mikhail Alekhin, Eindhoven (NL)

(73) Assignees: STICHTING VOOR DE TECHNISCHE WETENSCHAPPEN, Utrecht (NL); UNIVERSITE DE BERNE, Berne (CH)

( * ) Notice: Subject to any disclaimer, the term of this patent is extended or adjusted under 35 U.S.C. 154(b) by 0 days.

(21) Appl. No.: 16/926,548

(22) Filed: Jul. 10, 2020

(65) Prior Publication Data
US 2020/0339878 A1 Oct. 29, 2020

Related U.S. Application Data

(63) Continuation-in-part of application No. PCT/EP2019/050455, filed on Jan. 9, 2019.

(30) Foreign Application Priority Data

Jan. 11, 2018 (FR) .................................. 1850233
Jan. 11, 2018 (FR) .................................. 1850234

(51) Int. Cl.
*C09K 11/77* (2006.01)
*G01T 1/20* (2006.01)
*G01T 1/202* (2006.01)

(52) U.S. Cl.
CPC ........ *C09K 11/7791* (2013.01); *G01T 1/2006* (2013.01); *G01T 1/2018* (2013.01); *G01T 1/2023* (2013.01)

(58) Field of Classification Search
CPC . C09K 11/7791; G01T 1/2006; G01T 1/2018; G01T 1/2023
See application file for complete search history.

(56) References Cited

U.S. PATENT DOCUMENTS 3,988,252 A 10/1976 Ferretti
4,075,495 A 2/1978 Stevels et al.
(Continued)

FOREIGN PATENT DOCUMENTS

FR 2287058 A1 4/1976

OTHER PUBLICATIONS

Feofilov P P: "Phototransfer of an electron in MeF2; Eu, Sm monocrystals", Database INSPEC [online] The Institution of Electrical Engineers, Stevenage, GB; Apr. 1962 (Apr. 1, 1962), Database accession No. 1963A00951. (Reference to be provided).
(Continued)

*Primary Examiner* — Hugh Maupin
(74) *Attorney, Agent, or Firm* — Abel Schillinger, LLP

(57) ABSTRACT

The disclosure relates to a scintillator and a radiation detector including the scintillator. The scintillator includes a scintillator material. In an embodiment, the scintillator material can include a metal halide doped with $Eu^{2+}$ and co-doped with $Sm^{2+}$. The metal halide can include at least one halogen selected from Br, Cl, and I. In an embodiment, the metal halide can include at least one element selected from alkaline-earth metals, rare-earth elements, Al, Ga, and the alkali metals selected from Li, Na, Rb, Cs. In a particular embodiment, co-doping with $Sm^{2+}$ can shift the scintillation (Continued)

light emission peak to a region of the emission spectrum having a low self-absorbance of the scintillator material.

39 Claims, 3 Drawing Sheets

(56) References Cited

U.S. PATENT DOCUMENTS

| | | | |
|---|---|---|---|
| 4,261,854 | A | 4/1981 | Kotera et al. |
| 7,067,815 | B2 | 6/2006 | Dorenbos et al. |
| 7,067,816 | B2 | 6/2006 | Dorenbos et al. |
| 2005/0188914 | A1 | 9/2005 | Iltis et al. |
| 2006/0104880 | A1 | 5/2006 | Iltis et al. |
| 2007/0241284 | A1 | 10/2007 | Iltis et al. |
| 2007/0272898 | A1 | 11/2007 | Kotera et al. |
| 2008/0128624 | A1 | 6/2008 | Cooke et al. |
| 2009/0166585 | A1 | 7/2009 | Bourret-Courchesne et al. |
| 2012/0085972 | A1 | 4/2012 | LaCourse et al. |
| 2013/0020928 | A1* | 1/2013 | Srivastava .............. H01J 61/44 313/486 |
| 2015/0353822 | A1 | 12/2015 | Tyagi et al. |
| 2018/0066185 | A1* | 3/2018 | Boatner .................. C30B 11/08 |
| 2018/0155620 | A1* | 6/2018 | Stand ........................ G21K 4/00 |
| 2018/0321393 | A1* | 11/2018 | Wu ........................ C01G 25/006 |
| 2019/0250286 | A1 | 8/2019 | Wu et al. |
| 2019/0256769 | A1 | 8/2019 | Jia et al. |
| 2021/0147748 | A1 | 5/2021 | Blahuta et al. |

OTHER PUBLICATIONS

Su Yiguo et al.: "Ce3+ and Ln3+ (Ln=Dy, Eu, Sm, Tb) Codoped SrF2 Nanoparticles: Synthesis and Multicolor Light Emission.", Database Medline [online] US National Library of Medicine (NLM), Bethesda, MD, US; Apr. 2016 (Apr. 1, 2016), XP002784965, Database accession No. NLM27451745. (Reference to be provided).

J. T. M. De Haas; P. Dorenbos, IEEE Trans. Nucl. Scl, vol. 55, 2008, pp. 1086. (Reference to be provided).

Alekhin et al., Journal of Luminescence, vol. 167, 2015, pp. 347-351. (Reference to be provided).

R. Cywinski. "Fluorescence in Doubly Doped KCl: Eu2+, Sm2+ Crystals" Phys/CA Status Solidi. B, Basic Research., DE, vol. 186, No. 2, Dec. 1, 1994 (Dec. 1, 1994), pp. 575-580. XP055508744. (Reference to be provided).

Journal of Nanoscience and Nanotechnology Apr. 2016, vol. 16, No. 4, Apr. 2016 (Apr. 1, 2016), pp. 3956-3960, ISSN: 1533-4899. (Reference to be provided).

Optika I Spektroskopia USSR, vol. 12, No. 4, Apr. 1, 1962 (Apr. 1, 1962), pp. 531-533. (Reference to be provided).

International Search Report from PCT Application No. PCT/EP2019/050454, filed Jan. 9, 2019, 3 pgs.

International Search Report from PCT Application No. PCT/EP2019/050455, filed Jan. 9, 2019, 3 pgs.

Feofilov P P: "Phototransfer of an electron in MeF2; Eu, Sm monocrystals", Database INSPEC [online] The Institution of Electrical Engineers, Stevenage, GB; Optika I Spektroskopia USSR, vol. 12, No. 4, Apr. 1, 1962 (Apr. 1, 1962), XP-002784964 and XP-002784960; Abstract in English.

Su Yiguo et al.: "Ce3+ and Ln3+ (Ln=Dy, Eu, Sm, Tb) Codoped SrF2 Nanoparticles: Synthesis and Multicolor Light Emission.", XP002784965 and XP-002784961, Database accession No. NLM27451745, Journal of Nanoscience and Nanotechnology Apr. 2016, vol. 16, No. 4, Abstract in English.

De Hass, et al. "Advances in Yield Calibration of Scintillators", IEEE Transactions on Nuclear Science, vol. 55, No. 3, Jun. 2008, 8 pages.

Alekhin et al., "Luminescence and Spectroscopic Properties of Sm2+ and Er3 Doped SrI2", Journal of Luminescence, vol. 167, 2015, pp. 347-351.

R. Cywinski. "Fluorescence in Doubly Doped KCl: Eu2+, Sm2+ Crystals" Phys/CA Status Solidi. B, Basic Research., DE, vol. 186, No. 2, Dec. 1, 1994, XP055508744, 6 pages.

* cited by examiner

SCINTILLATOR INCLUDING A MATERIAL DOPED WITH AN ACTIVATOR AND CO-DOPANT AND RADIATION DETECTOR INCLUDING THE SCINTILLATOR

CROSS-REFERENCE TO RELATED APPLICATION(S)

The present application is a continuation-in-part of and claims priority under 35 U.S.C. § 120 to International Application No. PCT/EP2019/050455, entitled "SCINTILLATOR MATERIAL COMPRISING A CRYSTALLINE CATION HALIDE DOPED BY $EU^{2+}$ AND CO-DOPED WITH $SM^{2+}$," by Pieter DORENBOS, et al., filed Jan. 9, 2019, which claims priority to both French Patent Application No. 1850233, entitled "SCINTILLATOR MATERIAL COMPRISING A CRYSTALLINE ALKALINE-EARTH HALIDE DOPED WITH AN ACTIVATOR AND CO-DOPED WITH $SM^{2+}$," by Pieter DORENBOS, et al., filed Jan. 11, 2018, and French Patent Application No. 1850234, entitled "SCINTILLATOR MATERIAL COMPRISING A CRYSTALLINE CATION HALIDE DOPED BY $EU^{2+}$ AND CO-DOPED WITH $SM^{2+}$," by Pieter DORENBOS, et al., filed Jan. 11, 2018, of which all three applications are incorporated by reference herein in their entireties.

FIELD OF THE DISCLOSURE

The disclosure relates to the field of scintillators that may equip detectors for detecting ionizing radiation, such as X-rays and gamma rays and ionizing particles, and in particular, to a scintillator including a scintillator material including an activator and a co-dopant and a detector including the scintillator.

DESCRIPTION OF RELATED ART

Ionizing radiation (which includes ionizing particles such as, in particular, protons, neutrons, electrons, muons, alpha particles, ions, and X-rays or gamma rays) are customarily detected using single-crystal scintillators that convert the incident radiation into light, which is then transformed into an electrical signal using a photodetector such as a photomultiplier. The scintillators used may in particular be made of a single crystal of thallium-doped sodium iodide (denoted hereinafter by NaI(Tl)), of sodium- or thallium-doped cesium iodide or of a praseodymium- or cerium-doped lanthanum halide.

The inorganic scintillators customarily used are crystalline, and very often monocrystalline. In order to efficiently detect the ionizing radiation, they are preferably of relatively large size, i.e. having a volume of greater than 1 $cm^3$ in order to increase the probability of encounter between high-energy radiative photons and the scintillator material. However, it is also advisable for the scintillator to absorb the least possible amount of the light that it emits itself in order to guarantee the emission by the scintillator of a sufficient light intensity (phenomenon referred to as self-absorption), necessary for obtaining a good energy resolution. It may sometimes be difficult to have a large-volume scintillator that is not very self-absorbent. $SrI_2$ doped with europium (Eu) is an attractive scintillator that has a high scintillation intensity, up to 120 000 photons/MeV, a good energy resolution (2.8% for 662 keV in gamma detection) and a decay time of 1.2 µs. However, the scintillation takes place at around 430 nm (blue color), a wavelength at which the scintillator is highly self-absorbent, which greatly deteriorates the energy resolution of the detectors using it.

The matrix of the halide may in particular be an alkali metal halide such as NaI or CsI or an alkaline-earth metal halide such as $SrI_2$.

Rare-earth element halides such as $LaBr_3$:Ce or $LaCl_3$:Ce or silicates $Lu_2SiO_5$:Ce and $(Lu, Y)_2SiO_5$:Ce are scintillators with a high light intensity that absorb their own light very little.

$SrI_2$:$Sm^{2+}$ has less self-absorption than $SrI_2$:$Eu^{2+}$. However, $SrI_2$:$Sm^{2+}$ has a low scintillation intensity.

It has now been found that it was possible to retain a good scintillation intensity of a crystalline cation halide doped with europium ($Eu^{2+}$) and to very greatly reduce the problem of self-absorption owing to the shifting of the maximum of the emission wavelength of the scintillation to a range (greater than 670 nm) in which this absorption is virtually zero, by co-doping the material with samarium ($Sm^{2+}$). A phenomenon of resonant energy transfer from the ions of the dopant to the co-dopant could explain this behavior. Co-doping with $Sm^{2+}$ shifts the scintillation light emission peak to 770 nm. At this wavelength, the self-absorption of the light emitted by the scintillator is very low and even virtually zero.

BRIEF DESCRIPTION OF THE DRAWINGS

Embodiments are illustrated by way of example and are not limited by the accompanying figures.

Figure 1:
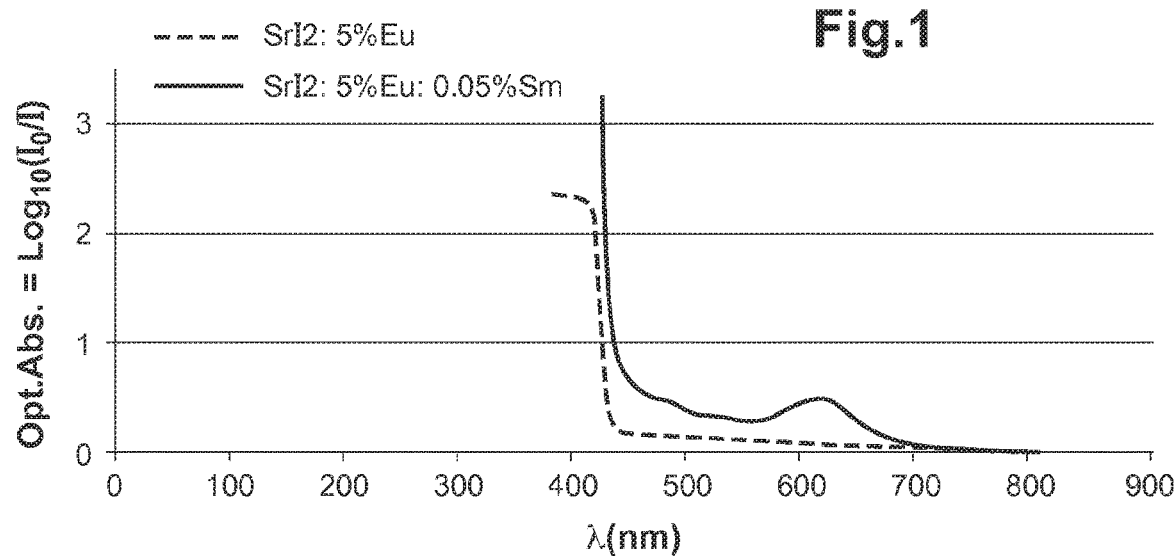
FIG. 1 includes an illustration of the optical absorbance of scintillator materials.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the scintillation and radiation detection arts.

The scintillator material according to the disclosure is an object capable of being placed in an ionizing radiation detector. The scintillator material according to the invention has a volume of greater than 1 cm3 in order to increase the probability of encounter between high-energy radiative photons and itself. For the same reason, its thickness is preferably at least 1.8 mm in all directions, and generally at least 2.0 mm in all directions. This material is generally at least 1.8 mm and even at least 2.0 mm in two mutually orthogonal directions, and at least 4 mm and even at least 8 mm in a direction orthogonal to the first two directions. The material according to the invention is transparent or translucent with respect to the light that it emits itself. In particular, its optical absorption coefficient is less than 50% for the wavelength at which its scintillation emission is maximum. The material is transparent for its own emitted light at least 2 mm depth and generally at least 4 mm depth. A monocrystalline nature of the scintillator material according to the invention is favorable for the good transparency thereof.

The scintillator material according to the invention can be used in an ionizing radiation detector. This material receives the ionizing radiation, which makes it emit a scintillation light, which is detected by a suitable photodetector coupled to the scintillator material. Of course, it is advisable to use a photodetector sensitive to the scintillation wavelengths. Within the context the present invention, the photodetector is preferably sensitive in the wavelength range of greater than 670 nm, in particular at 770 nm. The photodetector may in particular comprise an avalanche photodiode or an SiPMR (silicon photomultiplier, red-sensitive) or a red-extended PMT (photomultiplier tube).

The invention relates to a scintillator material for detecting ionizing radiation comprising an inorganic crystalline cation halide comprising at least one cation other than Eu2+ and Sm2+, which is doped with Eu2+ and co-doped with $Sm^{2+}$, said cation halide comprising at least one halogen selected from Br, Cl, I. Preferably, the cation halide comprises at least one cation selected from alkaline-earth metals, rare-earth elements, Al, Ga, and alkali metals selected from Li, Na, Rb, Cs. $Eu^{2+}$ activates the scintillation of the scintillator material. The cation halide comprises at least one cation (other than $Eu^{2+}$ and $Sm^{2+}$) that may be selected from alkali metals selected from Li, Na, Rb, Cs, alkaline-earth metals, rare-earth elements (i.e. Sc, Y and the lanthanides from La to Lu, except for Eu and Sm), Al, Ga. The cation halide may comprise an alkali metal cation such as $Na^+$ or $Cs^+$. If it is present, the alkali metal K is not the only cation in the cation halide and may not be present therein. In particular, KCl doped with $Eu^{2+}$ and/or with $Sm^{2+}$ may not be present in the cation halide since it is a poor scintillator. Moreover, a matrix of material containing K is not customarily considered to be an advantageous candidate as scintillator since natural potassium contains a lot of radioactive $^{40}K$ isotope, which is responsible for a high background noise, which greatly limits the use of the material as ionizing radiation detector. The cation halide may comprise at least one cation, or even at least two cations, of alkaline-earth metal type selected from Mg, Ca, Sr, Ba. In the alkaline-earth metals, Sr is preferred. Preferably, the cation halide comprises at least one halogen selected from Br, Cl, I. Preferably, at least 60 mol % and more preferably at least 80 mol % of the halogen atoms of the cation halide are selected from Br, Cl, I. It may comprise at least two halogens (in particular I and Cl or I and Br), or even three halogens selected from Br, Cl, I. The cation halide may not comprise F. Europium ($Eu^{2+}$) is a dopant that activates the scintillation of the cation halide. Generally, the scintillator material consists of the cation halide doped with $Eu^{2+}$ and co-doped with $Sm^{2+}$.

The scintillator material according to the disclosure may consist of the polycrystalline or monocrystalline cation halide.

In the context of the present disclosure, the cation halide may have a formula in which the ratio between cations and anions departs from stoichiometry, in the form of anion or cation vacancies in the crystal lattice.

A cation of the cation halide is a positive ion such as an alkali metal selected from Li, Na, Rd, Cs or an alkaline-earth metal, or a rare-earth element or Al or Ga or Eu or Sm. The anions are the negative ions of halogen type. When it is said that a cation Z is present in a proportion of x mol % in the cation halide, x is equal to 100 times the ratio of the number of moles of Z divided by the sum of the number of moles of all the cations, including Z. In particular, $Eu^{2+}$ is generally present in the cation halide in a proportion of more than 0.2 mol %. Generally, $Eu^{2+}$ may be present in the cation halide in a proportion of less than 20 mol % and more generally of less than 10 mol %. In particular, $Sm^{2+}$ is generally present in the cation halide in a proportion of more than 0.01 mol % and generally of more than 0.1 mol %. Generally, $Sm^{2+}$ may be present in the cation halide in a proportion of less than 10 mol % and more generally of less than 2 mol %.

The cation halide may in particular comprise a compound selected from sodium iodide, scandium iodide, strontium iodide, this compound being doped with $Eu^{2+}$ and co-doped with $Sm^{2+}$. The cation halide may consist of a compound selected from sodium iodide, scandium iodide, strontium iodide, this compound being doped with $Eu^{2+}$ and co-doped with $Sm^{2+}$.

The material according to the disclosure may be such that the cation halide comprises strontium iodide, $Eu^{2+}$ being present as scintillation activator dopant in the cation halide in a proportion of more than 0.2 mol % and generally of less than 20 mol %, more generally of less than 10 mol %, $Sm^{2+}$ being present in the cation halide in a proportion of more than 0.01 mol % and generally of more than 0.1 mol % and generally of less than 10 mol % and more generally of less than 2 mol %.

The material according to the disclosure may in particular be of "matrix" type doped with $Eu^{2+}$ and co-doped with $Sm^{2+}$, the dopant and the co-dopant being present in the amounts described above, the matrix possibly being selected from the following list:

$SrBrI$, $SrI_2$, $CaBr_2$, $CaI_2$, $CaClBr$;

$Rb_2BaBr_4$, $Cs_2BaBr_4$;

CsSrBr$_3$, RbCaBr$_3$, CsCaBr$_3$, CsSrCl$_3$, CsCaCl$_3$, CsCaI$_3$, KCaBr$_3$, CsSrI$_3$, KCaI$_3$, KMgBr$_3$, CsMgBr$_3$, CsMgI$_3$; KSr$_2$Br$_5$, RbBa$_2$I$_5$, KBa$_2$I$_5$, CsBa$_2$I$_5$, KSr$_2$I$_5$, RbSr$_2$I$_5$, KSr$_2$I$_5$, RbLn$_2$I$_5$ in which Ln is at least one element selected from Yb, Eu, Nd, Dy, Tm;

EuBr$_2$, EuI$_2$, YbBr$_2$, YbI$_2$.

In particular, the scintillator material according to the disclosure may be one of those from the following list:

Sr$_{(1-x-y)}$Eu$_x$Sm$_y$I$_2$ wherein 0<x<0.2, 0<y<0.1;

Sr$_{(1-x-y)}$Eu$_x$Sm$_y$I$_{2(1-u-v)}$Br$_{2u}$Cl$_{2v}$ wherein 0<x<0.2, 0<y<0.1, 0≤u<0.5, 0≤v<0.5, and (u+v)>0;

Sr$_{(1-x-y)}$Eu$_x$Sm$_y$I$_{(2+q)(1-u-v)}$Br$_{((2+q)*u)}$Cl$_{((2+q)*v)}$ wherein 0<x<0.2, 0<y<0.1, 0≤u<0.5, 0≤v<0.5, −0.05<q<0.05;

(Sr$_{(1-z)}$Ca$_z$)$_{(1-x-y)}$Eu$_x$Sm$_y$I$_2$ wherein 0<x<0.2, 0<y<0.1, and 0≤z≤1.0;

(Sr$_{(1-z)}$Ca$_z$)$_{(1-x-y)}$Eu$_x$Sm$_y$I$_{2(1-u-v)}$Br$_{2u}$Cl$_{2v}$ wherein 0<x<0.2, 0<y<0.1, 0≤u≤1.0, 0≤v≤1.0, 0≤(u+v)≤1.0, and 0≤z≤1.0;

(Sr$_{(1-z)}$Ca$_z$)$_{(1-x-y)}$Eu$_x$Sm$_y$I$_{(2+q)(1-u-v)}$Br$_{((2+q)*u)}$Cl$_{((2+q)*v)}$ wherein 0<x<0.2, 0<y<0.1, 0≤u<1.0, 0≤v≤1.0, 0≤(u+v)≤1.0, −0.05<q<0.05, and 0≤z≤1.0;

(Eu$_{(1-x)}$Yb$_x$)$_{(1-y)}$Sm$_y$I$_{(2+q)(1-u-v)}$Br$_{((2+q)*u)}$Cl$_{((2+q)*v)}$ wherein 0≤x≤1.0, 0<y<0.1, 0≤u≤1.0, 0≤v≤1.0, 0≤(u+v)≤1.0, and 0.05<q<0.05;

or one of those of the following formulae:

AB$_{(1-x-y)}$C$_x$Sm$_y$I$_{(3+q)(1-u-v)}$Br$_{((3+q)*u)}$Cl$_{((3+q)*v)}$ wherein 0<x<0.2, 0<y<0.1, 0≤u≤1.0, 0≤v≤1.0, 0≤(u+v)≤1.0, and 0.05<q<0.05;

A$_2$B$_{(1-x-y)}$C$_x$Sm$_y$I$_{(4+q)(1-u-v)}$Br$_{((4+q)*u)}$Cl$_{((4+q)*v)}$ wherein 0<x<0.2, 0<y<0.1, 0≤u≤1.0, 0≤v≤1.0, 0≤(u+v)≤1.0, −0.1<q<0.1;

AB$_{2(1-x-y)}$C$_{2x}$Sm$_{2y}$I$_{(5+q)(1-u-v)}$Br$_{((5+q)*u)}$Cl$_{((5+q)*v)}$ wherein 0<x<0.2, 0<y<0.1, 0≤u≤1.0, 0≤v≤1.0, 0≤(u+v)≤1.0, −0.1<q<0.1;

with the convention that in the last three formulae, the letter A represents an element or a mixture of elements selected from Na, K, Cs, Rb, and comprising at least one element selected from Na, Cs, Rb, the letter B represents an element or a mixture of elements selected from Ca, Mg, Ba, Sr, and the letter C (except of course the C in Cl which represents chlorine) represents an element or a mixture of elements selected from Eu$^{2+}$, Yb$^{2+}$, and necessarily comprising Eu$^{2+}$.

In the ten formulae above, generally x>0.002 and generally x<0.1. In the ten formulae above, generally y>0.0001 and generally y>0.001. In the ten formulae above, generally y<0.02. In the formulae above the symbol "≤" signifies "less than or equal to" and the symbol "<" signifies "strictly less than". Note, by way of example, that y<0.02 is equivalent to saying that Sm$^{2+}$ is at less than 2 mol % in the halide.

The scintillator material according to the disclosure may comprise or be strontium iodide comprising Eu$^{2+}$ as dopant that activates its scintillation and co-doped with Sm$^{2+}$.

The scintillator material according to the disclosure may be polycrystalline but is preferably monocrystalline. A single crystal may be obtained by a single-crystal growth process well known to a person skilled in the art such as the Czochralski technique or Bridgman technique or Bagdasarov technique (horizontal Bridgman technique) or Kyropoulos technique or else the "vertical gradient freeze" technique (crystallization by thermal gradient control) or the technique referred to as EFG (edge feeding growth) or else the technique referred to as continuous feeding which covers the use of multiple crucibles, in particular the growth of crystals in a double crucible, one of the crucibles being in the other. The invention also relates to a process for manufacturing the material according to the invention, comprising the crystalline growth thereof according to the Czochralski or Bridgman or Bagdasarov or Kyropoulos technique or the technique of crystallization by thermal gradient control or the EFG technique.

The disclosure related also to ionizing radiation detector comprising the scintillator material according to the disclosure. In particular, the detector preferably comprises a photodetector sensitive to a wavelength greater than 670 nm, in particular sensitive at 770 nm.

FIG. 1 represents the optical absorbance of, on the one hand, a crystal of SrI$_2$:5 mol % Eu and, on the other hand, that of a crystal of SrI$_2$:5 mol % Eu:0.05 mol % Sm, as a function of the wavelength λ in nm. The absorbance is equal to the decimal logarithm of the ratio of the incident light intensity I$_0$ to the emergent light intensity I. It is seen that the optical absorbance of the two crystals is very high around 430 nm and virtually zero above 700 nm.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A radiation detector, comprising:
a scintillator comprising a scintillator material comprising:
a dopant that activates scintillation and has a first emission wavelength; and
a co-dopant having a second emission wavelength greater than the first emission wavelength, wherein:
the scintillator material is configured to emit at a first wavelength range and at a second wavelength range spaced apart from the first wavelength range, wherein the first wavelength range includes the first emission wavelength, and the second emission wavelength range includes the second emission wavelength length;
a wavelength of maximum emission of the scintillator material is in the second wavelength range; and
self-absorption of the scintillator material is higher at the first wavelength range than self-absorption at the second wavelength range; and
a photodetector coupled to the scintillator.

Embodiment 2. The radiation detector of embodiment 1, wherein the scintillator material comprises a metal halide.

Embodiment 3. The radiation detector of embodiment 2, wherein the metal halide comprises a metal element including an alkaline-earth metal element, a rare-earth element, Al, Ga, an alkali metal element, or any combination thereof.

Embodiment 4. The radiation detector of embodiment 2, wherein the metal halide comprises an alkali metal including Li, Na, Rb, Cs, or a combination thereof.

Embodiment 5. The radiation detector of embodiment 2, wherein the metal halide comprises a rare earth metal element including Yb, Eu, Nd, Dy, Tm, or a combination thereof.

Embodiment 6. The radiation detector of embodiment 2, wherein the metal halide comprises an alkaline-earth metal element including Mg, Ca, Sr, Ba, or any combination thereof.

Embodiment 7. The radiation detector of embodiment 1, wherein the dopant comprises a lanthanide.

Embodiment 8. The radiation detector of embodiment 1, wherein the dopant comprises $Eu^{2+}$.

Embodiment 9. The radiation detector of embodiment 1, wherein the co-dopant is capable of being excited by the excited dopant.

Embodiment 10. The radiation detector of embodiment 1, wherein the co-dopant comprises a lanthanide.

Embodiment 11. The radiation detector of embodiment 10, wherein the co-dopant comprises $Sm^{3+}$.

Embodiment 12. The radiation detector of embodiment 1, wherein the second wavelength range is greater than 670 nm.

Embodiment 13. The radiation detector of embodiment 1, wherein the wavelength of maximum emission is greater than 700 nm.

Embodiment 14. The radiation detector of embodiment 1, wherein the photodetector sensitive to a wavelength in the second emission wavelength range.

Embodiment 15. A radiation detector, comprising:
a scintillator including a scintillator material, wherein the scintillator material comprises a metal halide doped with a dopant that activates scintillation and a co-dopant, wherein the dopant comprises a lanthanide and a first emission wavelength; and the co-dopant comprises a lanthanide different from the dopant and a second emission wavelength is greater than the first emission wavelength,
wherein:
the scintillator material is configured to emit at a first wavelength range and at a second wavelength range spaced apart from the first wavelength range, wherein the first wavelength range includes the first emission wavelength, and the second emission wavelength range includes the second emission wavelength length;
a maximum emission wavelength of the scintillator material is in the second wavelength range; and
self-absorption of the scintillator material is higher at the first wavelength range than self-absorption at the second wavelength range; and
a photodetector coupled to the scintillator.

Embodiment 16. The radiation detector of embodiment 15, wherein the dopant comprises Eu2+.

Embodiment 17. The radiation detector of embodiment 15, wherein the co-dopant comprises $Sm^{3+}$.

Embodiment 18. The radiation detector of embodiment 15, wherein the metal halide comprises a metal element including an alkaline-earth metal element, a rare-earth element, Al, Ga, an alkali metal element, or any combination thereof.

Embodiment 19. The radiation detector of embodiment 15, wherein the scintillator second wavelength range is greater than 670 nm.

Embodiment 20. A scintillator, comprising a crystalline scintillator material comprising a metal halide doped with $Eu^{2+}$ and co-doped with $Sm^{2+}$, said metal halide comprising a halogen including Br, Cl, I, or a combination thereof.

Embodiment 21. The scintillator of embodiment 20, wherein the metal halide comprises an element including an alkaline-earth metal, a rare-earth element, Al, Ga, an alkali metal, or any combination thereof, wherein the alkali metal comprises Li, Na, Rb, Cs, or a combination thereof.

Embodiment 22. The scintillator of embodiment 20, wherein the metal halide comprises at least two halogens.

Embodiment 23. The scintillator of embodiment 20, wherein the metal halide comprises at least one of Na or Cs.

Embodiment 24. The scintillator of embodiment 20, wherein the scintillator material comprises cesium iodide.

Embodiment 25. The scintillator of embodiment 20, characterized in that the metal halide comprises an alkaline-earth metal including Mg, Ca, Sr, Ba, or any combination thereof.

Embodiment 26. The scintillator of embodiment 20, wherein the scintillator material comprises strontium iodide.

Embodiment 27. The scintillator of embodiment 20, wherein $Eu^{2+}$ is present in the metal halide in a proportion of more than 0.2 mol % and less than 20 mol %.

Embodiment 28. The scintillator of embodiment 27, wherein $Eu^{2+}$ is the proportion of less than 10 mol %.

Embodiment 29. The scintillator of embodiment 20, wherein $Sm^{2+}$ is present in the metal halide in a proportion of more than 0.01 mol % and less than 10 mol %.

Embodiment 30. The scintillator of embodiment 29, wherein $Sm^{2+}$ is present in the proportion of at least 0.05 mol %.

Embodiment 31. The scintillator of embodiment 20, wherein the scintillator material comprises strontium iodide, $Eu^{2+}$ being in a proportion of more than 0.2 mol % and less than 10 mol %, $Sm^{2+}$ being in a proportion of at least 0.05 mol % and at most 1 mol %.

Embodiment 32. The scintillator of embodiment 20, wherein the scintillator material is represented by a formula selected from the group consisting of:

$Sr_{(1-x-y)}Eu_xSm_yI_2$ wherein $0<x<0.2$, $0<y<0.1$;

$Sr_{(1-x-y)}Eu_xSm_yI_{2(1-u-v)}Br_{2u}Cl_{2v}$ wherein $0<x<0.2$, $0<y<0.1$, $0\le u<0.5$, $0\le v<0.5$, and $(u+v)>0$;

$Sr_{(1-x-y)}Eu_xSm_yI_{(2+q)(1-u-v)}Br_{((2+q)*u)}Cl_{((2+q)*v)}$, wherein $0<x<0.2$, $0<y<0.1$, $0\le u<0.5$, $0\le v<0.5$, and $0.05<q<0.05$;

$(Sr_{(1-z)}Ca_z)_{(1-x-y)}Eu_xSm_yI_2$ wherein $0<x<0.2$, $0<y<0.1$, and $0\le z\le1.0$;

$(Sr_{(1-z)}Ca_z)_{(1-x-y)}Eu_xSm_yI_{2(1-u-v)}Br_{2u}Cl_{2v}$ wherein $0<x<0.2$, $0<y<0.1$, $0\le u\le1.0$, $0\le v\le1.0$, $0\le(u+v)\le1.0$, and $0\le z\le1.0$;

$(Sr_{(1-z)}Ca_z)_{(1-x-y)}Eu_xSm_yI_{(2+q)(1-u-v)}Br_{((2+q)*u)}Cl_{((2+q)*v)}$ wherein $0<x<0.2$, $0<y<0.1$, $0\le u\le1.0$, $0\le v\le1.0$, $0\le(u+v)\le1.0$, $0.05<q<0.05$, and $0\le z\le1.0$;

$(Eu_{(1-x)}Yb_x)_{(1-y)}Sm_yI_{(2+q)(1-u-v)}Br_{((2+q)*u)}Cl_{((2+q)*v)}$ wherein $0\le x\le1.0$, $0<y<0.1$, $0\le u\le1.0$, $0\le v\le1.0$, $0\le(u+v)\le1.0$, and $0.05<q<0.05$;

or one of those of the following formulae:

$AB_{(1-x-y)}C_xSm_yI_{(3+q)(1-u-v)}Br_{((3+q)*u)}Cl_{((3+q)*v)}$ wherein $0<x<0.2$, $0<y<0.1$, $0\le u\le1.0$, $0\le v\le1.0$, $0\le(u+v)\le1.0$, and $0.05<q<0.05$;

$A_2B_{(1-x-y)}C_xSm_yI_{(4+q)(1-u-v)}Br_{((4+q)*u)}Cl_{((4+q)*v)}$ wherein $0<x<0.2$, $0<y<0.1$, $0\le u\le1.0$, $0\le v\le1.0$, $0\le(u+v)\le1.0$, and $0.1<q<0.1$;

$AB_{2(1-x-y)}C_{2x}Sm_{2y}I_{(5+q)(1-u-v)}Br_{((5+q)*u)}Cl_{((5+q)*v)}$ wherein $0<x<0.2$, $0<y<0.1$, $0\le u\le1.0$, $0\le v\le1.0$, $0\le(u+v)\le1.0$, and $0.1<q<0.1$;

wherein A represents an element including Na, K, Cs, Rb, or a combination thereof, B represents an element including Ca, Mg, Ba, Sr, or a combination thereof, and C represents an element including $Eu^{2+}$, $Yb^{2+}$, or a combination thereof.

Embodiment 33. The scintillator of embodiment 20, comprising an optical absorption coefficient less than 50% at a wavelength of maximum emission.

Embodiment 34. The scintillator of embodiment 20, the scintillator material has a volume greater than 1 $cm^3$.

Embodiment 35. The scintillator of embodiment 20, wherein the scintillator material comprises a thickness of at least 1.8 mm.

Embodiment 36. The scintillator of embodiment 20, wherein the scintillator material is transparent to scintillation light emitted in a depth of at least 2 mm in the scintillator material.

Embodiment 37. The scintillator of embodiment 20, wherein the scintillator material is monocrystalline.

Embodiment 38. A radiation detector, comprising the scintillator of embodiment 20.

Embodiment 39. The radiation detector of embodiment 38, comprising a photodetector sensitive to a wavelength of greater than 670 nm.

Examples 1 to 5

Single crystals of $SrI_2$:$Eu^{2+}$,$Sm^{2+}$ were produced by vertical Bridgman crystal growth in a sealed quartz ampoule. To do this, a mixture of powders of $SrI_2$, $EuI_2$, $SmI_2$ in the desired proportions was placed in the ampoule. This mixture was then heated until the melting thereof, at around 700° C. The samples contained 5 mol % of $Eu^{2+}$ and, depending on the sample, 0 or 0.05 or 0.2 or 0.5 mol % of $Sm^{2+}$. Ingots were prepared then cleaved in order to make a flat coupling surface with the photodetector. Due to the hygroscopic nature of the samples, these were handled in a glove box under a dry nitrogen atmosphere, containing less than 1 ppm of water. The percentages are given in mol %.

The scintillation intensity was recorded in the glove box using a $^{137}$Cs gamma source at 662 keV. Use was made, as photodetector, of a windowless Photonix APD avalanche photodiode (type 630-70-72-510), under a voltage of 1600 V and cooled to 250K. The output signal was amplified with "shaping time" conditions of 6 µs by an ORTEC 672 spectroscopic amplifier. In order to maximize the light collection, the samples were enveloped in Teflon powder then compressed (according to the technique described by J. T. M. de Haas and P. Dorenbos, IEEE Trans. Nucl. Sci. 55, 1086 (2008)), except for the cleaved face intended for coupling with the photodiode.

The light intensities of crystals around 2 mm in diameter and in height subjected to gamma radiation at 662 keV are given in table 1. Note that for such small dimensions, the self-absorption is negligible and the results therefore indeed express the intensity of the scintillation phenomenon. In this table, the compositions are described as comprising a matrix doped with an $Eu^{2+}$ dopant (absent for comparative example 5) and co-doped with an $Sm^{2+}$ co-dopant (absent for comparative example 1).

TABLE 1

| x. no. | Matrix | $[Eu^{2+}]$ (mol %) | $[Sm^{2+}]$ (mol %) | Light intensity (ph/MeV) | $Eu^{2+}$ emission wavelength (nm) | $Sm^{2+}$ emission wavelength (nm) |
|---|---|---|---|---|---|---|
| 1 (comp) | $SrI_2$ | 5 | 0 | 40500 | 431 | |
| 2 | | 5 | 0.05 | 39500 | 431 | 750 |
| 3 | | 5 | 0.2 | 33000 | 431 | 750 |
| 4 | | 5 | 0.5 | 42000 | 431 | 750 |
| 5 (comp) | $SrI_2$ | 0 | 1 | 6000 | | 750 |

Figure 2:
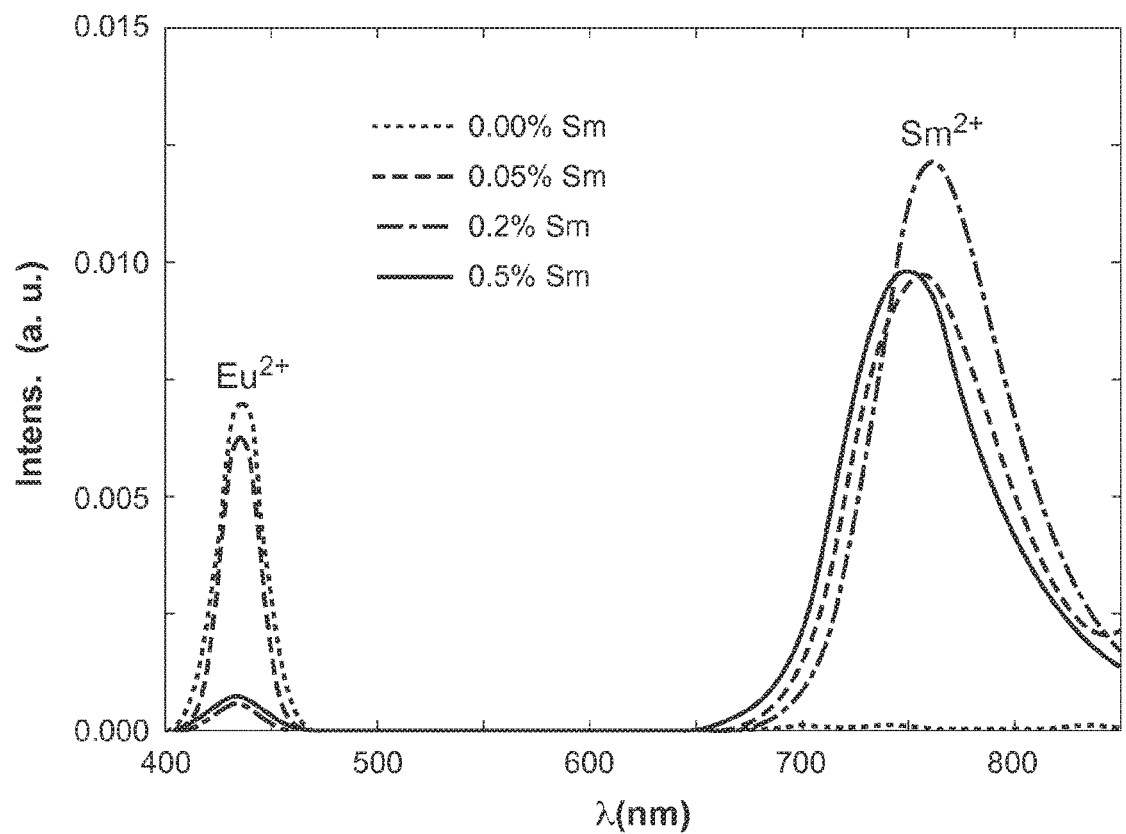
FIG. 2 includes an illustration including light emission spectrums of scintillator materials.

The photoluminescence excitation and emission spectrum were recorded by use of a Newport 66921 Xe UV lamp in combination with a Horiba Gemini-180 double-grating monochromator. The emission light from the crystals was detected by a Hamamatsu C9100-13 EM-CCD camera. The excitation spectrum was corrected to take into account the spectrum of the UV lamp, with no other correction for the emission spectrum. The light emission spectrum as a function of the content of $Sm^{2+}$ can be seen in FIG. 2. The $Eu^{2+}$ and $Sm^{2+}$ peaks are clearly distinguished. The $Eu^{2+}$ peak is rapidly reduced with the presence of a small amount of $Sm^{2+}$ due to the presumed energy transfer from $Eu^{2+}$ to $Sm^{2+}$. The capture of the charge carrier (electrons and holes) by $Eu^{2+}$ transposes the $Eu^{2+}$ ions to a 5d excited state. This excitation energy may be transferred into the vicinity of the $Sm^{2+}$ ions by a radiative or non-radiative energy transfer process. Thus, above 1 mol % of $Sm^{2+}$, the emission consists almost exclusively of an $Sm^{2+}$ emission. The co-doping of $SrI_2$:Eu with $Sm^{2+}$ therefore relates to a scintillator with high light intensity at more than 700 nm, which is remarkable and very advantageous considering the very low self-absorbance of the crystals at these wavelengths.

Examples 6 to 9

Single crystals were produced as for the preceding examples except that the compositions were those indicated in table 2. The compositions are described as comprising a matrix doped with an $Eu^{2+}$ dopant (absent for comparative example 7) and co-doped with an $Sm^{2+}$ co-dopant.

TABLE 2

| Ex. no. | Matrix | [$Eu^{2+}$] dopant (mol %) | [$Sm^{2+}$] co-dopant (mol %) | Light intensity (ph/MeV) | Energy resolution (%) | $Eu^{2+}$ emission wavelength (nm) | $Sm^{2+}$ emission wavelength (nm) |
|---|---|---|---|---|---|---|---|
| 6 | $CsBa_2I_5$ | 4 | 1 | 52000 | 4.5 | 422 | 758 |
| 7 (comp) | $CsBa_2I_5$ | 0 | 0.5 | 20500 | 14.8 | 422 | 758 |
| 8 | $CsBa_2I_5$ | 2 | 1 | 45800 | 3.2 | 422 | 758 |
| 9 | $CsSrI_3$ | 2 | 1 | 19100 | 9.7 | 454 | 839 |

Figure 3:
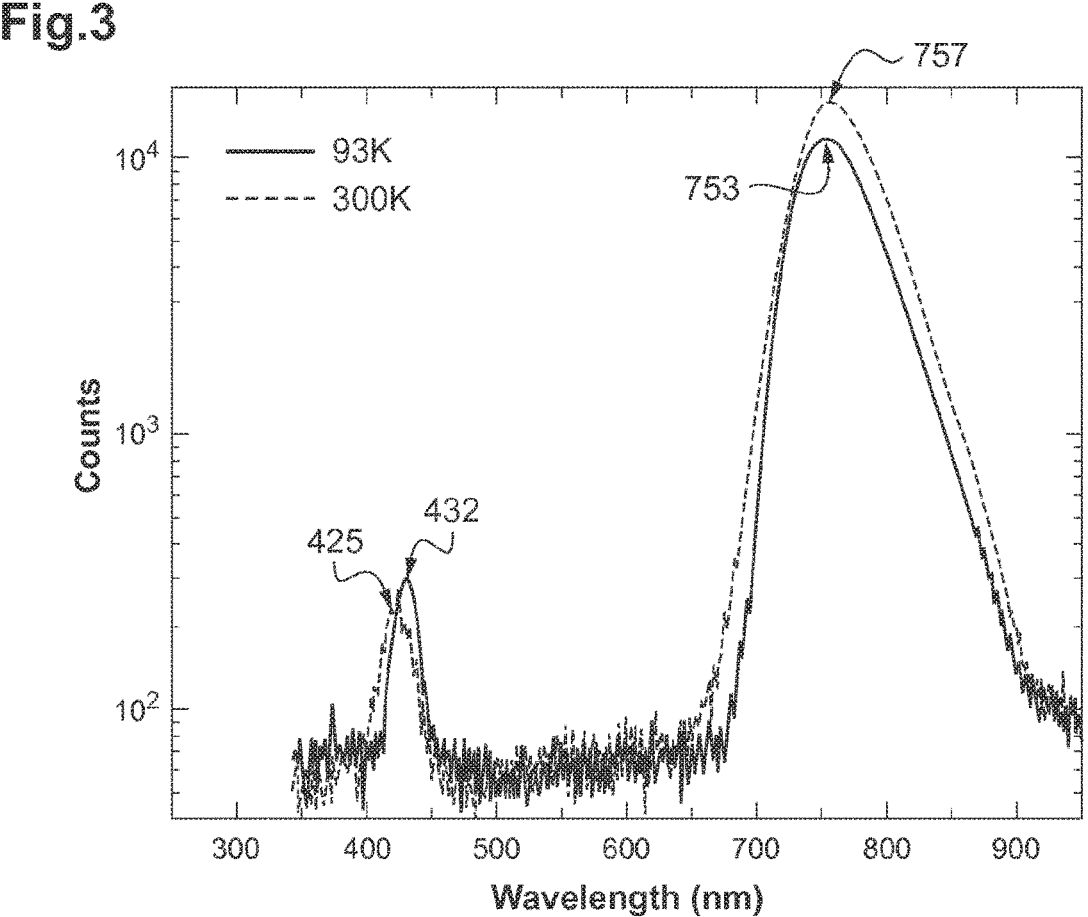
FIG. 3 includes an illustration including light emission spectrums of additional scintillator materials.

The light emission spectrum relative to the sample from example 8 can be seen in FIG. 3, measured at two different sample temperatures: 93K and 300K. The $Eu^{2+}$ and $Sm^{2+}$ peaks are clearly distinguished, for the 2 temperature cases.

Figure 4:
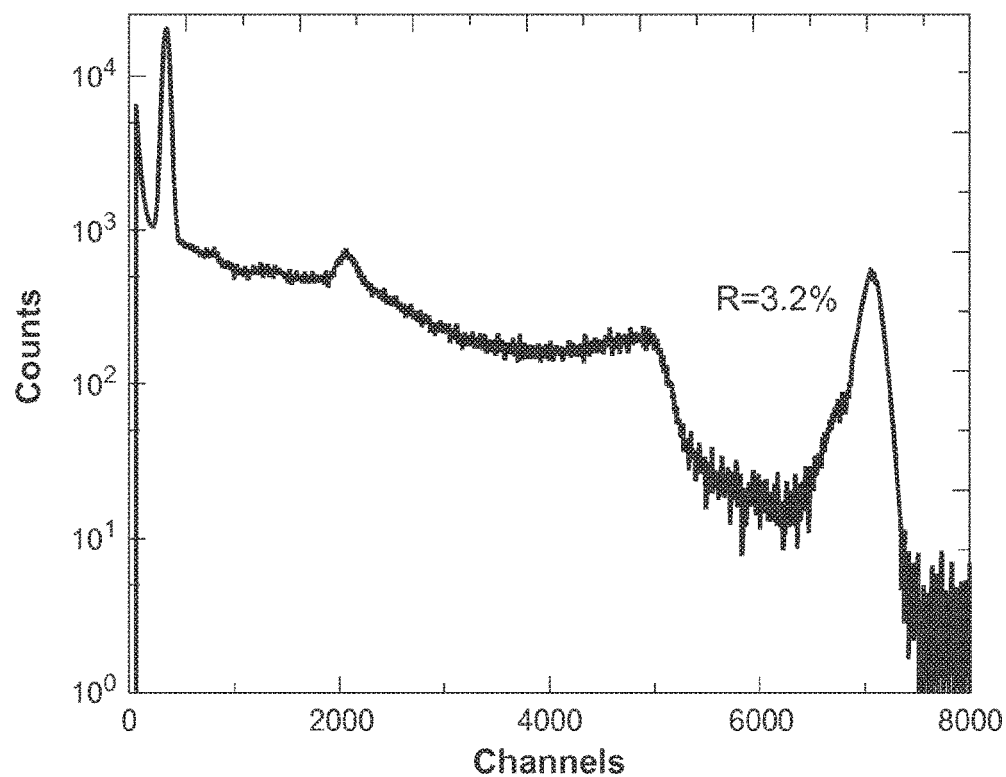
FIG. 4 includes an illustration of energy resolution of scintillator materials.

The good energy resolution properties of the sample from example 8 are illustrated by FIG. 4. Represented therein is the scintillation histogram, with, on the x-axis, values proportional to the amount of emitted light detected by the optical device (measured with a $^{137}Cs$ isotope source with an Advanced Photonix APD 630-70-72-510 detector, said detector being at the temperature of 270K), and, on the y-axis, the numbers of gamma ray photon interaction events with the scintillator. Seen therein is the formation of a scintillation peak with the energy resolution 3.2%, which is remarkable and very suitable for scintillators with a spectrometry property, in particular used in portable environmental monitoring detectors.

Figure 5:
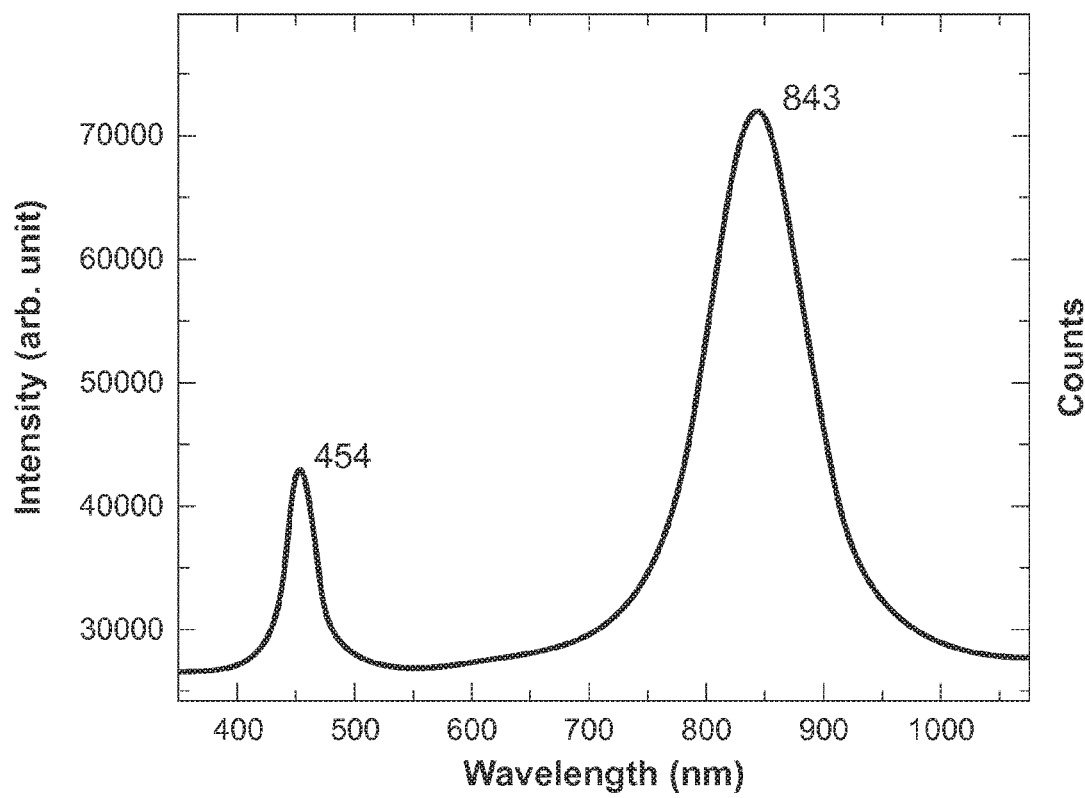
FIG. 5 includes an illustration including light emission spectrums of scintillator materials.

The light emission spectrum relative to the sample from example 9 can be seen in FIG. 5, measured at ambient sample temperature. The $Eu^{2+}$ and $Sm^{2+}$ peaks are clearly distinguished. The very high intensity in the infrared range at the maximum at 843 nm, corresponding to the $Sm^{2+}$ emission, is observed. The peak at 454 nm corresponds to the $Eu^{2+}$ emission. A dominance of the $Sm^{2+}$ emission is seen due to the energy transfer coming from $Eu^{2+}$.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detector, comprising:
   a scintillator comprising a scintillator material comprising:
      a dopant that activates scintillation and has a first emission wavelength; and
      a co-dopant having a second emission wavelength greater than the first emission wavelength,
   wherein:
      the scintillator material is configured to emit at a first wavelength range and at a second wavelength range spaced apart from the first wavelength range, wherein the first wavelength range includes the first emission wavelength, and the second emission wavelength range includes the second emission wavelength;
      a wavelength of maximum emission of the scintillator material is in the second wavelength range; and
      self-absorption of the scintillator material is higher at the first wavelength range than self-absorption at the second wavelength range; and
   a photodetector coupled to the scintillator.

2. The radiation detector of claim 1, wherein the scintillator material comprises a metal halide.

3. The radiation detector of claim 2, wherein the metal halide comprises a metal element including an alkaline-earth metal element, a rare-earth element, Al, Ga, an alkali metal element, or any combination thereof.

4. The radiation detector of claim 2, wherein the metal halide comprises an alkali metal including Li, Na, Rb, Cs, or a combination thereof.

5. The radiation detector of claim 2, wherein the metal halide comprises a rare earth metal element including Yb, Eu, Nd, Dy, Tm, or a combination thereof.

6. The radiation detector of claim 2, wherein the metal halide comprises an alkaline-earth metal element including Mg, Ca, Sr, Ba, or any combination thereof.

7. The radiation detector of claim 1, wherein the dopant comprises a lanthanide.

8. The radiation detector of claim 1, wherein the dopant comprises $Eu^{2+}$.

9. The radiation detector of claim 1, wherein the co-dopant is capable of being excited by the excited dopant.

10. The radiation detector of claim 1, wherein the co-dopant comprises a lanthanide.

11. The radiation detector of claim 10, wherein the co-dopant comprises $Sm^{3+}$.

12. The radiation detector of claim 1, wherein the second wavelength range is greater than 670 nm.

13. The radiation detector of claim 1, wherein the wavelength of maximum emission is greater than 700 nm.

14. The radiation detector of claim 1, wherein the photodetector sensitive to a wavelength in the second emission wavelength range.

15. A radiation detector, comprising:
a scintillator including a scintillator material, wherein the scintillator material comprises a metal halide doped with a dopant that activates scintillation and a co-dopant, wherein the dopant comprises a lanthanide and a first emission wavelength; and the co-dopant comprises a lanthanide different from the dopant and a second emission wavelength greater than the first emission wavelength,
wherein:
the scintillator material is configured to emit at a first wavelength range and at a second wavelength range spaced apart from the first wavelength range, wherein the first wavelength range includes the first emission wavelength, and the second emission wavelength range includes the second emission wavelength;
a maximum emission wavelength of the scintillator material is in the second wavelength range; and
self-absorption of the scintillator material is higher at the first wavelength range than self-absorption at the second wavelength range; and
a photodetector coupled to the scintillator.

16. The radiation detector of claim 15, wherein the dopant comprises $Eu^{2+}$.

17. The radiation detector of claim 15, wherein the co-dopant comprises $Sm^{3+}$.

18. The radiation detector of claim 15, wherein the metal halide comprises a metal element including an alkaline-earth metal element, a rare-earth element, Al, Ga, an alkali metal element, or any combination thereof.

19. The radiation detector of claim 15, wherein the second wavelength range is greater than 670 nm.

20. A scintillator, comprising a crystalline scintillator material comprising a metal halide doped with $Eu^{2+}$ and co-doped with $Sm^{2+}$, said metal halide comprising a halogen including Br, Cl, I, or a combination thereof, wherein the metal halide comprises an element including an alkaline-earth metal.

21. The scintillator of claim 20, wherein the metal halide comprises an element including a rare-earth element, Al, Ga, an alkali metal, or any combination thereof, wherein the alkali metal comprises Li, Na, Rb, Cs, or a combination thereof.

22. The scintillator of claim 20, wherein the metal halide comprises at least two halogens.

23. The scintillator of claim 20, wherein the metal halide comprises at least one of Na or Cs.

24. The scintillator of claim 20, wherein the scintillator material comprises cesium iodide.

25. The scintillator of claim 20, characterized in that the alkaline-earth metal Mg, Ca, Sr, Ba, or any combination thereof.

26. The scintillator of claim 20, wherein the scintillator material comprises strontium iodide.

27. The scintillator of claim 20, wherein $Eu^{2+}$ is present in the metal halide in a proportion of more than 0.2 mol % and less than 20 mol %.

28. The scintillator of claim 27, wherein $Eu^{2+}$ is the proportion of less than 10 mol %.

29. The scintillator of claim 20, wherein $Sm^{2+}$ is present in the metal halide in a proportion of more than 0.01 mol % and less than 10 mol %.

30. The scintillator of claim 29, wherein $Sm^{2+}$ is present in the proportion of at least 0.05 mol %.

31. The scintillator of claim 20, wherein the scintillator material comprises strontium iodide, $Eu^{2+}$ being in a proportion of more than 0.2 mol % and less than 10 mol %, $Sm^{2+}$ being in a proportion of at least 0.05 mol % and at most 1 mol %.

32. The scintillator of claim 20, wherein the scintillator material is represented by a formula selected from the group consisting of:

$Sr_{(1-x-y)}Eu_xSm_yI_2$ wherein $0<x<0.2$, $0<y<0.1$;

$Sr_{(1-x-y)}Eu_xSm_yI_{2(1-u-v)}Br_{2u}Cl_{2v}$ wherein $0<x<0.2$, $0<y<0.1$, $0 \le u<0.5$, $0 \le v<0.5$, and $(u+v)>0$;

$Sr_{(1-x-y)}Eu_xSm_yI_{(2+q)(1-u-v)}Br_{((2+q)*u)}Cl_{((2+q)*v)}$ wherein $0<x<0.2$, $0<y<0.1$, $0 \le u<0.5$, $0 \le v<0.5$, and $0.05<q<0.05$;

$(Sr_{(1-z)}Ca_z)_{(1-x-y)}Eu_xSm_yI_2$ wherein $0<x<0.2$, $0<y<0.1$, and $0 \le z \le 1.0$;

$(Sr_{(1-z)}Ca_z)_{(1-x-y)}Eu_xSm_yI_{2(1-u-v)}Br_{2u}Cl_{2v}$ wherein $0<x<0.2$, $0<y<0.1$, $0 \le u \le 1.0$, $0 \le v \le 1.0$, $0 \le (u+v) \le 1.0$, and $0 \le z \le 1.0$;

$(Sr_{(1-z)}Ca_z)_{(1-x-y)}Eu_xSm_yI_{(2+q)(1-u-v)}Br_{((2+q)*u)}Cl_{((2+q)*v)}$ wherein $0<x<0.2$, $0<y<0.1$, $0 \le u<1.0$, $0 \le v \le 1.0$, $0 \le (u+v) \le 1.0$, $-0.05<q<0.05$, and $0 \le z \le 1.0$;

$(Eu_{(1-x)}Yb_x)_{(1-y)}Sm_yI_{(2+q)(1-u-v)}Br_{((2+q)*u)}Cl_{((2+q)*v)}$ wherein $0 \le x \le 1.0$, $0<y<0.1$, $0 \le u \le 1.0$, $0 \le v \le 1.0$, $0 \le (u+v) \le 1.0$, and $0.05<q<0.05$;

or one of those of the following formulae:

$AB_{(1-x-y)}C_xSm_yI_{(3+q)(1-u-v)}Br_{((3+q)*u)}Cl_{((3+q)*v)}$ wherein $0<x<0.2$, $0<y<0.1$, $0 \le u \le 1.0$, $0 \le v \le 1.0$, $0 \le (u+v) \le 1.0$, and $0.05<q<0.05$;

$A_2B_{(1-x-y)}C_xSm_yI_{(4+q)(1-u-v)}Br_{((4+q)*u)}Cl_{((4+q)*v)}$ wherein $0<x<0.2$, $0<y<0.1$, $0 \le u \le 1.0$, $0 \le v \le 1.0$, $0 \le (u+v) \le 1.0$, and $0.1<q<0.1$;

$AB_{2(1-x-y)}C_{2x}Sm_{2y}I_{(5+q)(1-u-v)}Br_{((5+q)*u)}Cl_{((5+q)*v)}$ wherein $0<x<0.2$, $0<y<0.1$, $0 \le u \le 1.0$, $0 \le v \le 1.0$, $0 \le (u+v) \le 1.0$, and $0.1<q<0.1$;

wherein A represents an element including Na, K, Cs, Rb, or a combination thereof, B represents an element including Ca, Mg, Ba, Sr, or a combination thereof, and C represents an element including $Eu^{2+}$, $Yb^{2+}$, or a combination thereof.

33. The scintillator of claim 20, comprising an optical absorption coefficient less than 50% at a wavelength of maximum emission.

34. The scintillator of claim 20, the scintillator material has a volume greater than 1 $cm^3$.

35. The scintillator of claim 20, wherein the scintillator material comprises a thickness of at least 1.8 mm.

36. The scintillator of claim 20, wherein the scintillator material is transparent to scintillation light emitted in a depth of at least 2 mm in the scintillator material.

37. The scintillator of claim 20, wherein the scintillator material is monocrystalline.

38. A radiation detector, comprising the scintillator of claim 20.

39. The radiation detector of claim 38, comprising a photodetector sensitive to a wavelength of greater than 670 nm.

* * * * *

UNITED STATES PATENT AND TRADEMARK OFFICE
CERTIFICATE OF CORRECTION

PATENT NO. : 11,326,100 B2
APPLICATION NO. : 16/926548
DATED : May 10, 2022
INVENTOR(S) : Pieter Dorenbos et al.

It is certified that error appears in the above-identified patent and that said Letters Patent is hereby corrected as shown below:

In the Specification

In Column 13, Line 31, delete "comprises Sm3+." and insert --comprises $Sm^{3+}$.--

In Column 13, Line 56, delete "metal Mg," and insert --metal includes Mg,--

In Column 14, Line 27, delete "1.0, -0.05<q<0.05," and insert --1.0, 0.05<q<0.05,--

Signed and Sealed this
Twenty-sixth Day of September, 2023

Katherine Kelly Vidal
*Director of the United States Patent and Trademark Office*